(12) United States Patent
Chen et al.

(10) Patent No.: US 8,331,667 B2
(45) Date of Patent: Dec. 11, 2012

(54) IMAGE FORMING SYSTEM, APPARATUS AND METHOD OF DISCRIMINATIVE COLOR FEATURES EXTRACTION THEREOF

(75) Inventors: Maolin Chen, Beijing (CN); Moon Sik Jeong, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1169 days.

(21) Appl. No.: 12/216,707

(22) Filed: Jul. 29, 2008

(65) Prior Publication Data

US 2009/0087088 A1    Apr. 2, 2009

(30) Foreign Application Priority Data

Sep. 28, 2007  (CN) .......................... 2007 1 0151897
Dec. 24, 2007  (KR) ........................ 10-2007-0136917

(51) Int. Cl.
*G06K 9/00* (2006.01)
(52) U.S. Cl. ..................................................... 382/168
(58) Field of Classification Search .................. None
See application file for complete search history.

(56) References Cited

U.S. PATENT DOCUMENTS

| | | | |
|---|---|---|---|
| 2003/0128298 A1* | 7/2003 | Moon et al. | 348/578 |
| 2005/0012817 A1* | 1/2005 | Hampapur et al. | 348/143 |
| 2006/0147112 A1* | 7/2006 | Park et al. | 382/168 |

* cited by examiner

*Primary Examiner* — Jingge Wu
*Assistant Examiner* — Nirav G Patel
(74) *Attorney, Agent, or Firm* — Staas & Halsey LLP

(57) ABSTRACT

Provided are an apparatus and method of extracting a discriminative color feature, and an image forming system including: a photographing device to photograph an image of an object; a color feature extracting device receiving the image from the photographing device, extracting a discriminative color feature from the image, generating a final color model of the object, extracting a color blob of the object based on the final color model, performing blob analysis on the extracted color blob, and generating parameters to control a posturing of the photographing device according to the blob analysis; a control device receiving from the color feature extracting device the parameters to control the posturing of the photographing device, and controlling the posturing of the photographing device; a storage device storing the photographed image of the object; and a display device displaying the photographed image of the object.

20 Claims, 9 Drawing Sheets
(1 of 9 Drawing Sheet(s) Filed in Color)

FIG. 8
A
B
C

FIG. 9
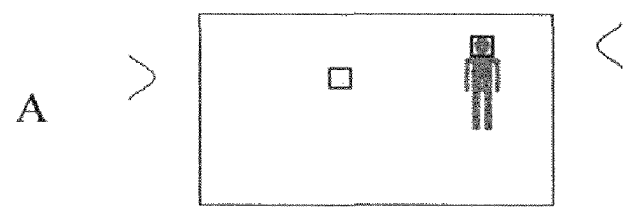
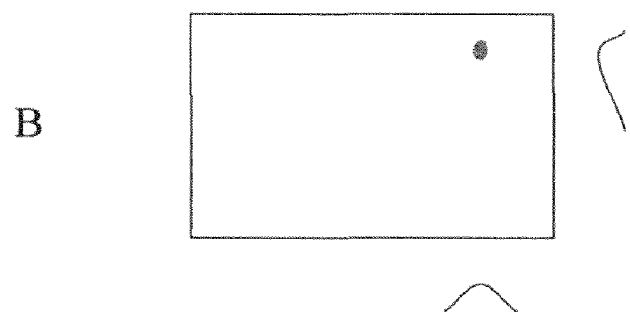
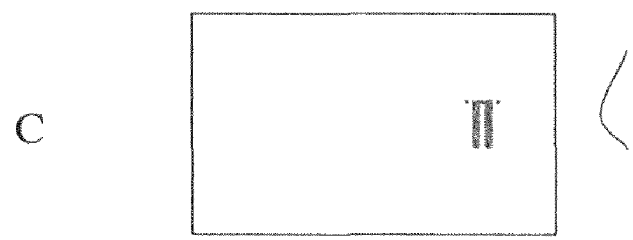
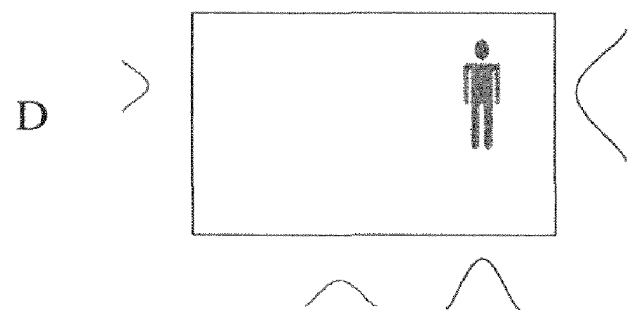

IMAGE FORMING SYSTEM, APPARATUS AND METHOD OF DISCRIMINATIVE COLOR FEATURES EXTRACTION THEREOF

CROSS-REFERENCE TO RELATED APPLICATIONS

This application claims the benefit of Chinese Patent Application No. 200710151897.8, filed on Sep. 28, 2007, in the Chinese States Intellectual Property Office, and the benefit of Korean Patent Application No. 10-2007-0136917, filed on Dec. 24, 2007, in the Korean Intellectual Property Office, the disclosures of which are incorporated herein by reference.

BACKGROUND

1. Field

The present invention relates to pattern recognition, feature extraction, statistical learning, and object detection technology such as human detection technology. More particularly, the present invention relates to an image forming system that can extract a discriminative feature for the color appearance of an object, or can form a hidden discriminative color distribution pattern contrasting with other objects of the same or different categories, and to an apparatus and method of extracting a discriminative color feature.

2. Description of the Related Art

A representative color feature of an object's appearance is widely used to detect and track an object in a video frame. Generally, a color histogram is used to represent the color feature. In order to capture the spatial layout of the color distribution, it may be appropriate to use a histogram of an independent sub-area that is comprised in an object area. In addition to the above scheme, other schemes such as motion information, shape information, constrained geometry, etc., may be used to compensate a color model to obtain improved detection results.

Various attempts have been made to solve the problems of tracking coherent moving objects using the color model. Examples of the attempts include a probabilistic tracking scheme using a color appearance, a color histogram modeling and probability map detection scheme, a scheme of comparing a plurality of similar searching windows based on the color model, a scheme of extracting a skin tone based on a statistical model, etc.

As described above, the representative color feature for the object appearance is widely used for object detection in the video frame. When representing the color feature, the color histogram is generally used to determine a location and a size of a moving object and calculate a color histogram of the moving object. In a subsequent video frame, the similarity map of the histogram model is calculated. Next, a blob analysis technology can cluster pixel areas with high similarity to a histogram model to blobs, which indicate a location of the moving object with high probability.

Many schemes focus on how to effectively represent the color feature of the moving object. Specifically, the most important issue is how to discriminate the moving object from a non-moving object, that is, other moving objects of the same or different category and a background, instead of forming the original color distribution of the object completely. In the case of the moving object, the moving object consists of many parts. For example, when it is assumed that the moving object is a human being, the human being includes a face/head, a dressed upper body and a dressed lower body. The color appearance of the human being may be similar to other image areas, particularly in an environment with a complex background. In this environment, it is necessary to select a discriminative color gamut from the human body as color features, instead of selecting the representative color feature of the whole human body.

SUMMARY

A discriminative color feature indicates a great color difference that exists between a moving object and another image area including a background image. In order to extract the discriminative color feature, a color vector of a color histogram of an object that is divided into a plurality of bins is compared with a color vector of a color histogram of the other image area. The importance of the color vector of the moving object near to the color vector of the other image area is reduced, whereas the importance of the color vector of the other image area is increased.

An aspect of the present embodiment provides an image forming system that can extract a discriminative color feature and provide a focus area for dynamic adjustment of a posturing of an image forming unit with respect to different environments of image formation and scenes, and an apparatus and method of extracting a discriminative color feature from a moving object in order to localize the moving object accurately in following video frames.

Additional aspects and/or advantages will be set forth in part in the description which follows and, in part, will be apparent from the description, or may be learned by practice of the invention.

The foregoing and/or other aspects are achieved by providing an image forming system, including: a photographing device to photograph an image of an object; a color feature extracting device receiving the image from the photographing device, extracting a discriminative color feature from the image, generate a final color model of the object, extracting a color blob of the object based on the final color model, performing blob analysis on the extracted color blob, and generating parameters to control a posturing of the photographing device according to the blob analysis; a control device receiving from the color feature extracting device the parameters to control the posturing of the photographing device, and controlling the posturing of the photographing device; a storage device storing the photographed image of the object; and a display device displaying the photographed image of the object.

The foregoing and/or other aspects are achieved by providing a color feature extracting device including: a main color extracting unit dividing an object area and a non-object area of an input image into a plurality of rectangles, generating a color histogram for each color channel, and extracting a main color of an object rectangle from the color histogram; a weight calculating unit calculating a minimum distance between a color histogram bin of the object rectangle and a color histogram bin of a non-object rectangle with respect to the main color, a bin weight of the color histogram of the object rectangle, a color channel weight of the object rectangle, and a weight of the object rectangle to a discriminative color feature of the object; and a final color model generating unit generating a final color model of the object based on the result of re-weighting the color histogram bins of the object rectangle based on the weight of the object rectangle and the color channel weight of the object rectangle.

The foregoing and/or other aspects are achieved by providing a method of extracting a discriminative color feature, including: dividing an object area and a non-object area of an input image into a plurality of rectangles, and generating a color histogram for each color channel to extract a main color of an object rectangle from the color histogram; calculating a minimum distance between a color histogram bin of the object rectangle and a color histogram bin of the non-object rectangle to identify a discriminative color histogram bin of the object rectangle from the histogram bin of the non-object rectangle; calculating a bin weight of the color histogram of the object rectangle based on the calculated minimum distance; calculating a color channel weight of the object rectangle and a weight of the object rectangle based on the calculated bin weight of the color histogram of the object rectangle; re-weighting the color histogram bin of the object rectangle based on the calculated color channel weight and the weight of the object rectangle to extract a discriminative color feature of the object; and generating a final color model of the object based on the result of re-weighting the color histogram bins of the object rectangle.

BRIEF DESCRIPTION OF THE DRAWINGS

The patent or application file contains at least one drawing executed in color. Copies of this patent or patent application publication with color drawing will be provided by the Office upon request and payment of the necessary fee. These and/or other aspects, features, and advantages will become apparent and more readily appreciated from the following description of an embodiment, taken in conjunction with the accompanying drawings of which:

FIG. 8 illustrates results of a color blob detection using a discriminative color feature according to an embodiment; and FIG. 9 illustrates a blob analysis used to define a location and a size of a human according to an embodiment.

DETAILED DESCRIPTION OF THE EMBODIMENT

Figure 1:
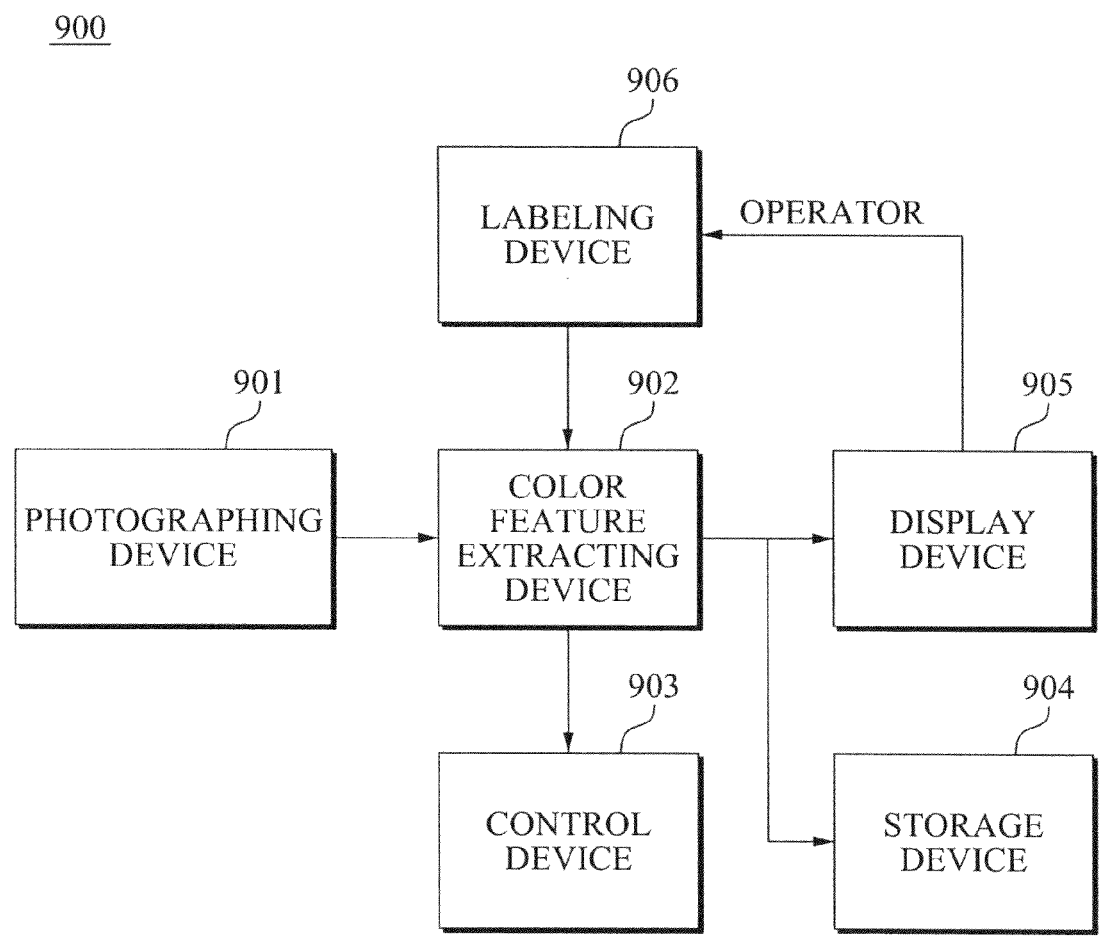
FIG. 1 is a block diagram illustrating an image forming system according to an embodiment.

Reference will now be made in detail to the embodiment, examples of which are illustrated in the accompanying drawings, wherein like reference numerals refer to the like elements throughout. The embodiment is described below to explain the present invention by referring to the figures.

FIG. 1 is a block diagram illustrating an image forming system 900 according to an embodiment.

The image forming system 900 includes a photographing device 901, a color feature extracting device 902 to extract a discriminative color feature, a control device 903, a storage device 904, a display device 905, and a labeling device 906. The image forming system 900 may be any one of a pan, tilt, zoom (PTZ) camera, a stationary surveillance camera, a digital camera (DC), a digital video (DV), a personal video recorder (PVR), and any other type of apparatus that allows for image formation.

The photographing device 901 is a hardware device to detect objects in nature and generate images of the objects. For example, a charge-coupled device (CCD) or a complementary metal-oxide semiconductor (CMOS) device may be installed. An image processing chip of the photographing device 901 may provide a high image quality. Two schemes may be used to track a moving object and provide a location and size of an object area.

The first scheme is an automatic scheme to extract a size and a location of an interesting object using an embedded algorithm. The second scheme is a manual scheme to label the interesting object area by a user or an operator on a displayed image, for example, a touch screen. In the case of the automatic scheme, the object may be automatically detected using the embedded algorithm. The labeling device 906 may provide the user or the operator with a labeling function so that the user or the operator may manually label the interesting object area on the image with a pen or a finger, for example.

The color feature extracting device 902 receives image data from the photographing device 901, and also receives size and location information of the interesting object area roughly labeled by the user. The color feature extracting device 902 extracts a discriminative color feature with respect to areas excluding an object to be tracked, that is, remaining areas with a background, generates a final color model of the object, extracts a color blob of the object based on the final color model, and performs blob analysis on the extracted color blob. Also, the color feature extracting device 902 generates parameters to control a posturing of the photographing device 901 based on the blob analysis. The labeling device 906 is optional when using the first scheme of providing the location and size of the object. Also, when selecting a plurality of tracking objects, or when there is a plurality of moving objects to be tracked, the user may change a tracking object automatically selected by the image forming system 900 according to the present embodiment.

The control device 903 adjusts the posturing of the image forming system 900, and controls at least one operation of a pan, a tilt, a zoom, and a selection of a light condensing area for a PTZ camera, for example, and controls an automatic light condensing operation or a zooming operation for a stationary surveillance camera, a DC, a DV, or a PVR, for example. The control device 903 receives from the color feature extracting device 902 the parameters to control the posturing of the image forming system 900. The color feature extracting device 902 may provide object location and size information at a new time point or may provide new frame data. The control device 903 may control the posturing of the image forming system 900 based on the parameters, to center the object in the image by the pan or the tilt operation, and control the image forming system 900 to select an interesting object area through the operation of selecting the light condensing area, and concentrate light on the interesting object area through the zooming and automatic focusing operation. Through this, it is possible to obtain details of the moving object with high image quality. In the selection of the light condensing area, the control device 903 controls the image forming system 900 to select a new area where the object is located as a light condensing basis, to condense light in the new area.

When the control device 903 controls the image forming system 900 to select the light condensing area, the image forming system 900 may select a central area of the image as a default light condensing area, or may dynamically select a new image area where the object is located as a light condensing area to form the image, and dynamically control a zoom rate, an automatic focus, a focal distance, a pan parameter or a tilt parameter based on image data information of the light condensing area. Through this, it is possible to obtain the effect of forming the image with high quality.

For an electronic product in market such as a DC, a DV, or a PVR, for example, a user may manually adjust the posturing of the electronic product to center the interesting object in an image. In this instance, the device itself may automatically perform other operations such as changing of a zoom rate, an automatic focus, etc.

The storage device 904 may save an image or a video, and the display device 905 may display the image or the video for the user.

The present embodiment may be implemented as software. The software may be connected to a system embedded into the image forming system 900 and the control device 903 and thereby may adjust parameters of the image forming system 900. In the case of an embedded image forming system, it is possible to receive video as input and transmit commands to the control unit 903 to adjust the posturing, the light condensing area, and the like of the image forming system 900.

According to the present embodiment, it is possible to extract a discriminative color model instead of extracting the object color appearance as the representative color histogram. There is a difference between the representative color model and the discriminative color model. When the color appearance of the moving object is greatly different from the non-object and the background color model, the discriminative color model may be similar to the representative color model. When the discriminative color model is dissimilar to the representative color model, particularly when the color appearance of the moving object is partially different from the non-object and the background color model, the present embodiment may determine a location of a targeted object using the discriminative color model in the complex background that has a interference color area similar to the moving object.

According to the present embodiment, it is possible to distinguish the targeted object from a plurality of moving objects with partially similar color and continuously determine the location and size of the targeted object to adjust the image forming system 900. Accordingly, it is possible to obtain a good image forming condition. The discriminative color model uses an importance weighting strategy principle. The discriminative color model increases the importance/weight of the color component that is greatly different from the non-object or the background, and decreases the importance/weight of the color component that is greatly similar to the non-object or the background.

Tracking the object using a stationary camera, or a PTZ camera for a targeted moving object used or suspected for an associated tracking interest may be used for the event analysis and the image quality improvement. A detection scheme using the discriminative color model scans an input image and transforms the scanned input image into a blob image based on the discriminative color model. The analysis of the blob image may be used to verify a human candidate in a human detector and eliminate a false positive.

In the case of a PTZ camera, the present embodiment may be implemented as software in an embedded system, which receives an input video image, analyzes the input video image, builds a discriminative color model of the input image, locates a human, adjusts the posturing of the PTZ camera such as a pan, a tilt, and a zoom, and tracks the human. Through this, it is possible to make the human in the central location of the image with the good resolution and the image quality. When the camera is panned and tilted, the moving human is tracked while preventing the moving human from going out of its field of view. When the PTZ camera performs optical zooming, the optical focal distance is adjusted to obtain a partial or full body view of the moving human with high image quality. A video recording system may save live data in the storage device. Also, the video recording system may record behavior of the human with the high image quality when the human enters an area determined by a user, or may perform some interactive operations with the device.

It is worthy to note that the present embodiment may be applicable in a portable image forming system, for example, a DC, a DV, or a mobile camera. An initial location and size of a human can be manually labeled by a user, or may be automatically detected by a detector. It is possible to automatically focus on a moving human and thereby obtain the high image quality by locating the moving human and directly adjusting the focal distance. Also, the user may manually adjust the lens direction of the image forming system in order to center the moving human in the image.

In the case of a stationary camera, the present embodiment may be implemented as a trajectory collection of the moving human with coherent tracking of the moving human. The trajectory includes the location and the size of the moving human. During tracking, the system may analyze whether an event occurs, or interactively transmit an alarm or a notification. The event defined by the user can be a hazardous situation, or a general notification for the user, for example, the location or size of the moving human as an intruder enters a predefined restricted area.

The term "image forming system" used herein refers to an apparatus that includes at least an imaging device and a control device, and may be a camcorder, a camera, or any other types of portable apparatus having an image forming function.

Also, the present embodiment may be used in a robot to locate the human using a robot image forming apparatus. The robot may have basic functions of avoiding obstacles, interacting with the human, tracking the human, etc. Also, according to the present embodiment, it is possible to track or interact with the human by determining whether there is a human in the neighboring area, or by locating the human.

Also, the present embodiment may be used to extract the discriminative color feature and detect moving objects of different categories. In the above-described example, the human is used as an example for ease of description. However, a candidate target application is not limited to modeling and detection of the human. For example, in forming an image of a moving object using a DC, a terminal user may manually label an interesting object area using a finger or writing with a pen on a touch screen and thereby indicate a location, a size, or an area of the object. According to the present embodiment, it is possible to build a discriminative color model of the object, and indicate the location and the size of the object in a subsequent video frame. Accordingly, the DC may adjust image forming parameters and thereby obtain the high image quality of the moving object.

Figure 2:
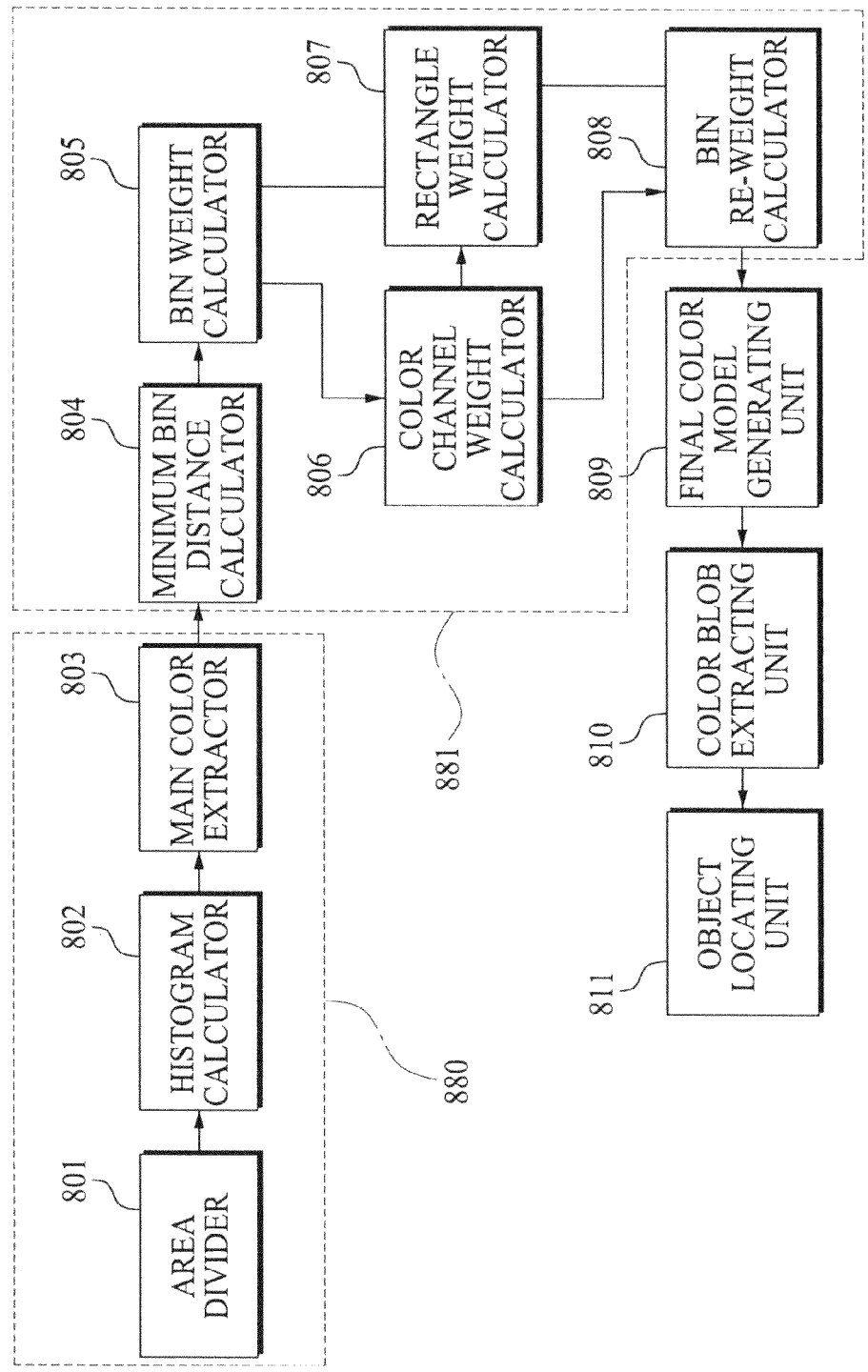
FIG. 2 is a block diagram illustrating a device to extract a discriminative color feature according to an embodiment.

FIG. 2 is a block diagram illustrating a device to extract a discriminative color feature according to an embodiment.

Referring to FIG. 2, the color feature extracting device 902 may further include an area divider 801, a histogram calculator 802, a main color extractor 803, a minimum bin distance calculator 804, a bin weight calculator 805, a color channel weight calculator 806, a rectangle weight calculator 807, a bin re-weight calculator 808, and a final color model generating unit 809.

Also, the color feature extracting device 902 includes a main color extracting unit 880 to divide an object area and a non-object area of an input image into a plurality of rectangles, generate a color histogram for each color channel, and extract a main color of the object rectangle from the color histogram, a weight calculating unit 881 to calculate a minimum distance between a color histogram bin of the object rectangle and a color histogram bin of a non-object rectangle with respect to the main color, a bin weight of the color histogram of the object rectangle, a color channel weight of the object rectangle, and a weight of the object rectangle, and thereby extract a discriminative color feature of the object, and the final color model generating unit 809 to generate a final color model of the object based on a result of re-weighting the color histogram bins of the object rectangle.

The main color extracting unit 880 includes the area divider 801, the histogram calculator 802, and the main color extractor 803. The main color extractor 803 extracts the main color of the object rectangle based on the color histogram generated by the histogram calculator 802.

The area divider 801 divides the object area and the non-object area of the input image into the plurality of rectangles. The histogram calculator 802 generates the color histogram of the object rectangle and the color histogram of the non-object rectangle using three color channels, respectively. In this instance, each color histogram is divided into the plurality of discrete bins. The main color extractor 803 extracts the main color of the object rectangle based on the generated color histogram.

The weight calculating unit 881 includes the minimum bin distance calculator 804, the bin weight calculator 805, the color channel weight calculator 806, the rectangle weight calculator 807, and the bin re-weight calculator 808.

The minimum bin distance calculator 804 calculates the minimum distance between the color histogram bin of the object rectangle and the color histogram bin of the non-object rectangle with respect to the main color extracted by the main color extractor 803. This is to decrease the weight of an indiscriminative bin from the non-object histogram bin in the color histogram bin of the object. The minimum bin distance calculator 804 calculates the minimum distance according to, $$J[H_r^c(i), BG^c(j)] = \operatorname*{argmin}_{j} |b_i - b'_j| \qquad \text{[Equation 1]}$$

$$D_r^c(i) = |b_i - '_j| \qquad \text{[Equation 2]}$$

where c denotes a color channel, r denotes an object rectangle, $b_i$ denotes an $i^{th}$ bin, J denotes one bin of the color histogram of the non-object rectangle of the color channel with the minimum distance to the $i^{th}$ bin of the color channel from a main color histogram of the object rectangle, $H_r^c(i)$ denotes the color histogram of the $i^{th}$ bin of the color channel of the object rectangle, $BG^c(j)$ denotes a non-object color histogram of a $j^{th}$ bin of the color channel of the non-object rectangle, $b'_j$ denotes the $j^{th}$ bin, and $D_r^c(i)$ denotes the minimum distance between the $i^{th}$ bin of the color histogram bin of the object rectangle and a non-object rectangle color histogram with the same color channel.

The bin weight calculator 805 calculates the weight of the color histogram bin of the object rectangle based on the minimum distance calculated by the minimum bin distance calculator 804. The bin weight calculator 805 calculates the weight of the color histogram bin of the object rectangle according to, $$w_r^c(i) = T(D_r^c(i),s) \times |H_r^c(i) - BG^c(J)|,$$

where $s = \operatorname{sign}(H_r^c(i) - BG^c(J)), T(x,y) = e^{x \times k \times y}$, and k is a constant. [Equation 3]

The color channel weight calculator 806 calculates the weight of the color channel of the object rectangle based on the weight of the color histogram bin of the object rectangle calculated by the bin weight calculator 805. The color channel weight calculator 806 calculates the weight of the color channel of the object rectangle according to Equation 4 and Equation 5 below. This is to increase the weight of a farther-located bin and decrease the weight of a closer-located bin from the non-object histogram bin among histogram bins of the object, and thereby have the discrimination of the histogram of the object.

$$w^c = \sum_{m=1}^{M} w_r^c(m) \qquad \text{[Equation 4]}$$

$$W^c = \frac{w^c}{\sum_{k=1}^{K} w^k} \qquad \text{[Equation 5]}$$

In Equation 4, the weight of each bin of one color channel is accumulated. Accordingly, the weight of each color channel is calculated according to Equation 5. In this instance, M denotes a number of bins of an object rectangle histogram where the object rectangle could be a human rectangle if the object is a human and K denotes a number of color channels.

The rectangle weight calculator 807 calculates the weight of the object rectangle based on the weight of the color histogram bin of the object rectangle calculated by the color channel weight calculator 806. The rectangle weight calculator 807 calculates the weight of the object rectangle according to, $$w_r = \sum_{k=1}^{K} \sum_{m=1}^{M} w_r^k(m) \qquad \text{[Equation 6]}$$

$$W_r = \frac{w_r}{\sum_{l=1}^{L} w_l}. \qquad \text{[Equation 7]}$$

The sum of bin weight of the object rectangle is calculated according to Equation 6, and the weight of the object rectangle is calculated according to Equation 7. In this instance, L denotes a number of object rectangles.

The bin re-weight calculator 808 re-weights the color histogram bin of the object rectangle based on the weight of the object rectangle calculated by the rectangle weight calculator 807 and the weight of the color channel calculated by the color channel weight calculator 806, and extracts the discriminative color feature of the object. The bin re-weight calculator 808 re-weights the color histogram bin of the object rectangle according to equation 8 below, $$W_r^c(i) = w_r^c(i) \times W_r \times W^c \qquad \text{[Equation 8]}$$

and thereby calculates the re-weighted color histogram bin of the object rectangle $W_r^c(i)$.

The final color model generating unit 809 generates the final color model of the object based on the result of re-weighting the color histogram bin of the object rectangle. Specifically, the final color model generating unit 809 generates the final color model of the object according to, $$N = \{N^r, N^g, N^b\} \quad \text{[Equation 9]}$$

$$N^c(i) = \sum_{r=1}^{R}\sum_{m=1}^{M} W_r^c(b_m = i),$$

where R denotes a number of object rectangles, and M denotes a number of bins of the object rectangle histogram.

Also, the color feature extracting device 902 further includes a color blob extracting unit 810 and an object locating unit 811.

The color blob extracting unit 810 extracts a color blob of the object from a new input image based on the final color model of the object. The object locating unit 811 performs blob analysis on the extracted color blob, calculates a centroid and a size of an object in the input image based on the blob analysis, and thereby locates and tracks the object.

Figure 3:
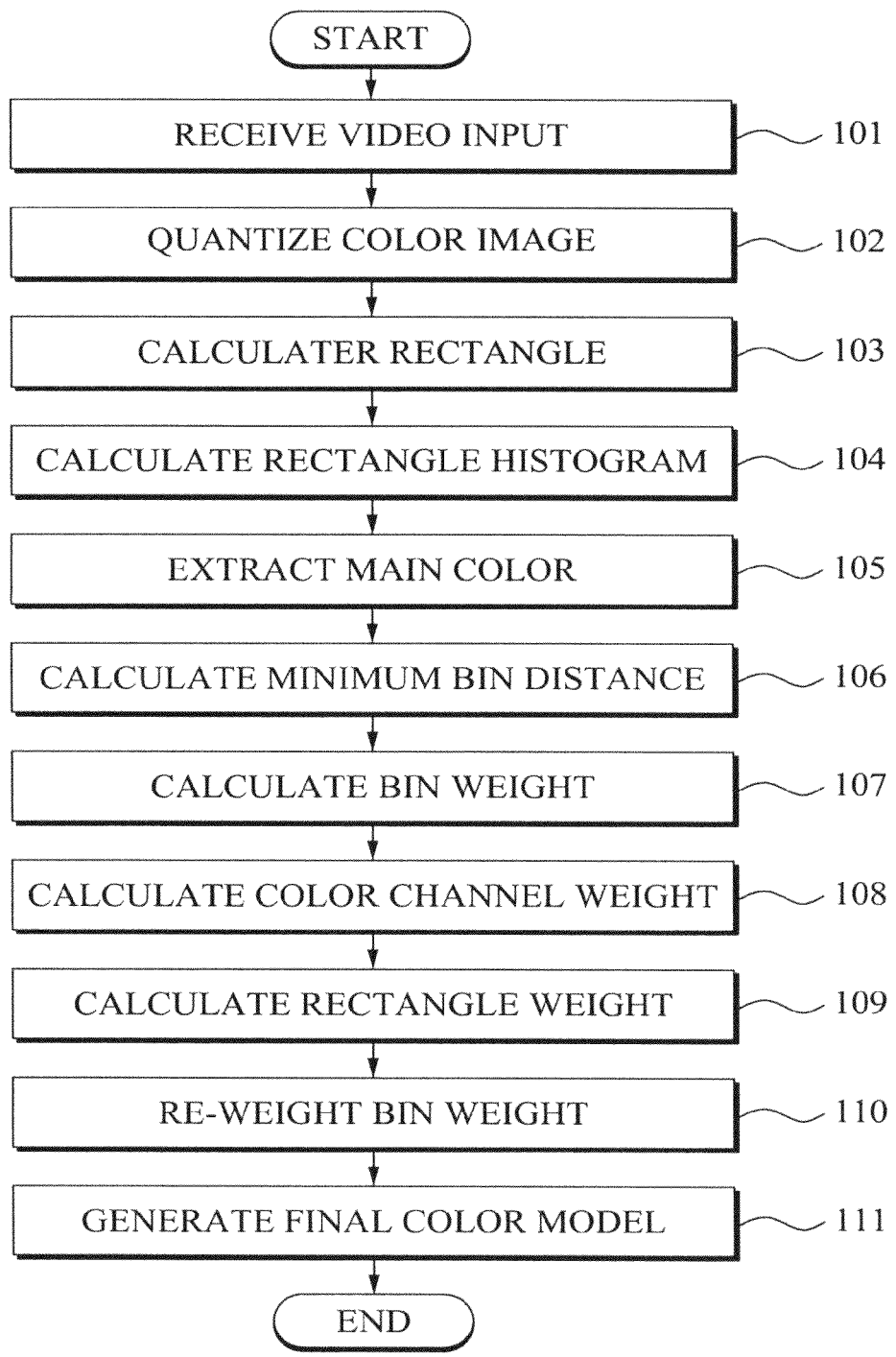
FIG. 3 is a flowchart illustrating a method of extracting a discriminative color feature according to an embodiment.

FIG. 3 is a flowchart illustrating a method of extracting a discriminative color feature according to an embodiment.

In operation 101, a system receives a video input, and location and size information of a human. The location and size information of the human is provided by motion extraction, manual labeling, or a human detector.

There are many motion extracting schemes. For example, background subtraction can be used because an image forming system is in a static state at an initial stage. In the case of manual labeling, it is possible to directly provide the location and size information of the human. The human detector may detect an input image for the location and size of a human candidate. Although the human has a different size in images, the width and the height ratio is within the fixed range and thus can be used to safely determine other image areas besides the moving object. Specifically, the non-object area includes the same or different categories of other objects and the background.

The following operations relate to extracting the discriminative color feature based on a known image area of a human rectangle and an image area of a non-human rectangle. In operation 102, a color image is quantized and color pixels with three color channels are quantized into N discrete bins. For example, N=64.

Figure 4:
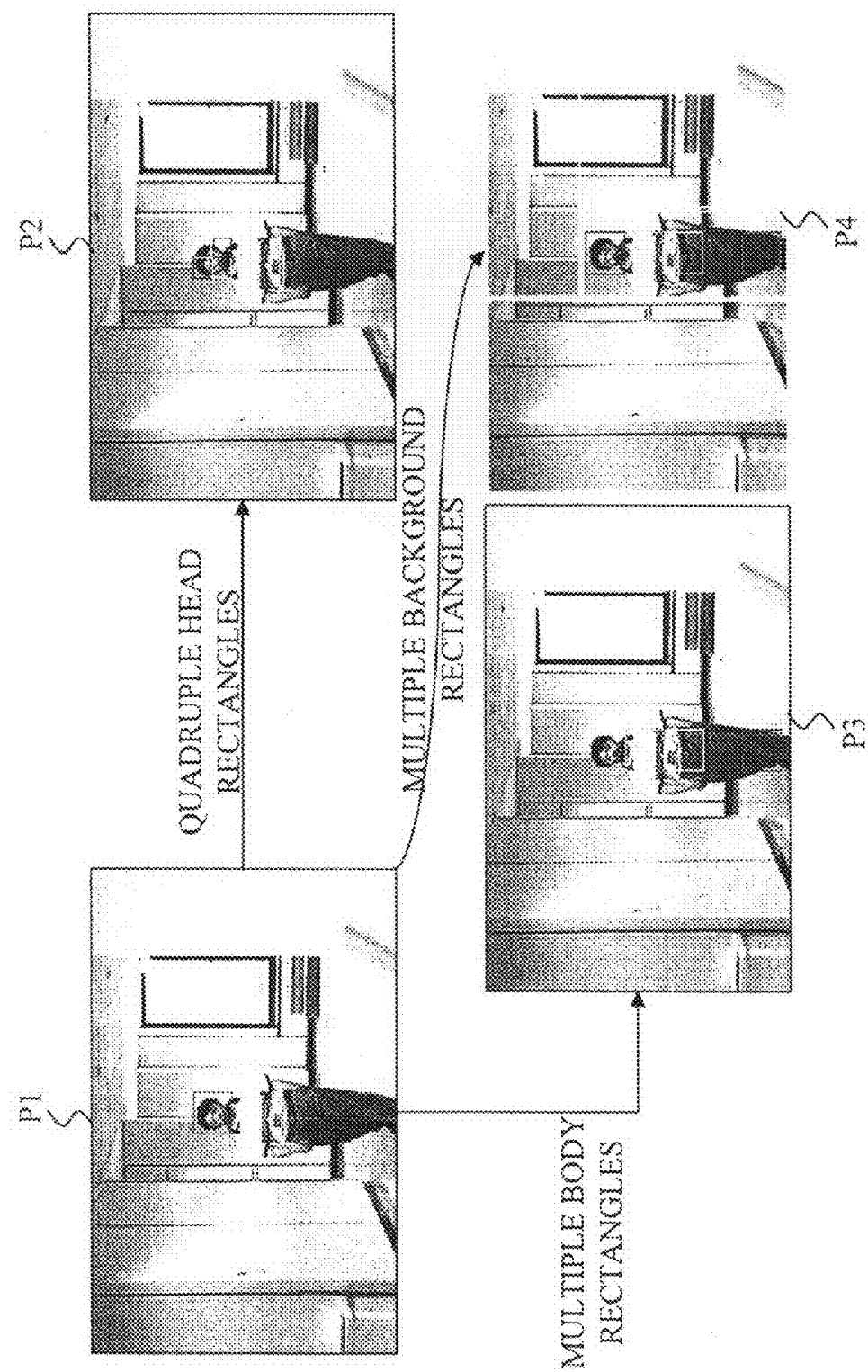
FIG. 4 illustrates how to calculate a human rectangle according to an embodiment.

In operation 103, rectangles of the human head and human body are calculated. FIG. 4 illustrates calculating rectangles of the human head and the human body. For example, when the location and size of the human head is given, a plurality of rectangles with the same size is downwardly arranged until reaching a bottom border of the image. The head rectangle is divided into a plurality of small rectangles, and, as already well-known, the human face and the human hair are distinct in color. According to the same principle, other image areas besides areas occupied by the human may be accurately measured based on the statistical height and width ratio of the human head. It is unnecessary to accurately measure background rectangle areas. Specifically, since the background rectangle areas may be approximately measured, image pixels without a moving object may be divided into background rectangles.

Figure 5:
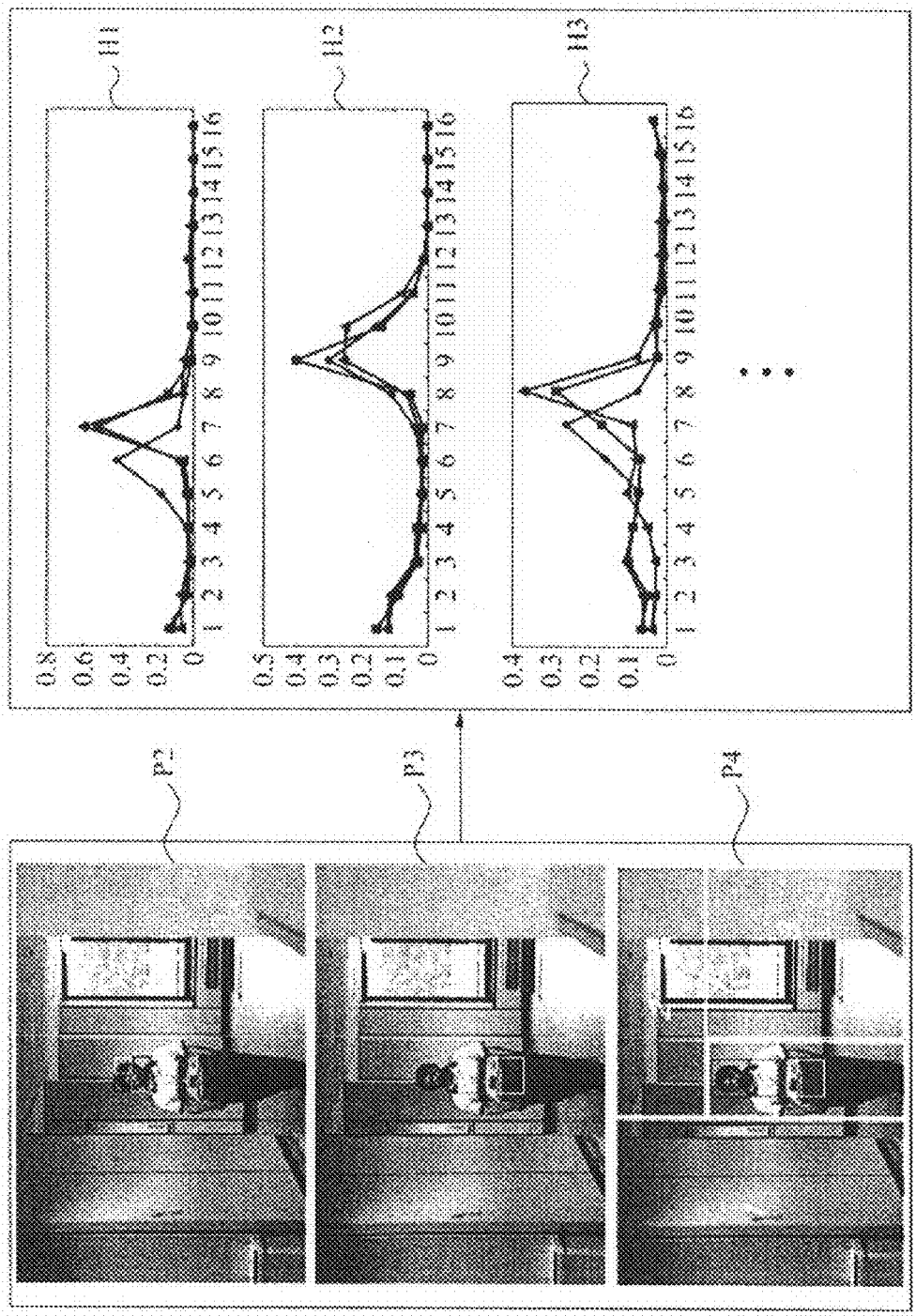
FIG. 5 illustrates calculation of each rectangle histogram according to an embodiment.

In operation 104, the rectangle histogram is calculated. FIG. 5 illustrates calculation of the color histogram of each rectangle that includes human head sub-rectangles, human body rectangles, and background rectangles, or other rectangles excluding the given human rectangles, i.e. non-object areas. The color histogram of each rectangle is calculated and is divided into a plurality of bins, and a number of pixels increases in each bin.

In operation 105, after obtaining the color histogram of each rectangle, a main color is extracted. Minor colors are deleted. Since noise may affect the minor colors with a small number of pixels, the minor colors are unstable or unreliable.

In operation 106, a minimum bin distance is calculated.

According to Equation 1 and Equation 2 above, the minimum distance between the color histogram bin of the object rectangle and the color histogram bin of the non-object rectangle is calculated. Hereinafter, it is assumed that the background area is the non-object area.

In operation 107, a bin weight is calculated.

The discriminating ability of one bin in the rectangle r and the channel c is defined as shown in Equation 3 above.

In operation 108, a color channel weight is calculated.

In each rectangle, pixels consist of three types of color channels that are a red element, a green element, and a blue element. Each color element is quantized into a plurality of histogram bins, and thus determines the distance of histogram bins associated therewith and has a different discriminating ability.

In operation 109, a rectangle weight is calculated.

The importance of one human rectangle is determined based on the discriminating ability of color bins included in the human rectangle. When the one human rectangle includes a highly discriminating color area, the human rectangle has a relatively large weight in comparison to other human rectangles.

In operation 110, the histogram bin is re-weighted according to the Equation 8 as described above.

Each histogram bin has a different discriminating ability between the targeted moving object and a complex background or other moving objects. The importance of the histogram bin is determined based on the initial weight $w_r^c(i)$ of the histogram bin, the color channel weight $W^c$, and the rectangle weight $W_r$. Accordingly, the final importance of the histogram bin is re-weighted according to Equation 8 above.

In operation 111, a final color model is generated using Equation 10 and Equation 11 below.

$$N_h = \{N_h^r, N_h^g, N_h^b\} \quad \text{[Equation 10]}$$

$$N_h^c(i) = \sum_{r=1}^{R_h}\sum_{m=1}^{N_h} W_r^c(b_m = i)$$

$$N_t = \{N_t^r, N_t^g, N_t^b\} \quad \text{[Equation 11]}$$

After re-weighting the histogram bin of each human rectangle, the final color model is generated according to Equation 10 and Equation 11 above, which represent the final color model, that is, a color histogram distribution, of the human head and the human body. In Equation 10 and Equation 11, the weight of the histogram bin in rectangles of the human head and the human body is accumulated, respectively. R denotes a number of human rectangles and M denotes a number of bins of the human rectangle. More specifically, $R_h$ denotes a number of human head rectangles, $N_h$ denotes a number of rectangle histogram bins of the human head, and $N_t$ denotes a number of rectangle histogram bins of the human body.

Figure 6:
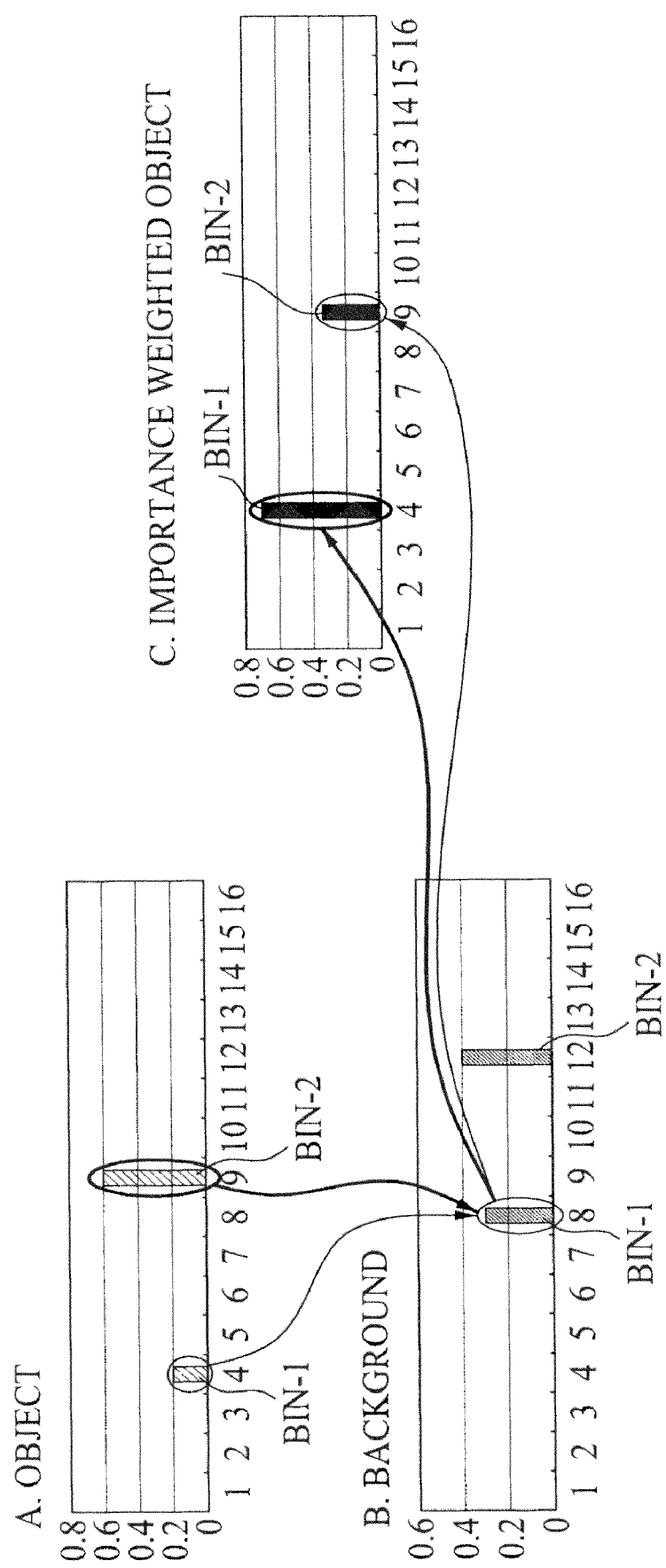
FIG. 6 illustrates calculation of a bin weight and effects of extracting a discriminative color feature according to an embodiment.

FIG. 6 illustrates an example to describe the main ideas behind this section.

Figure 7:
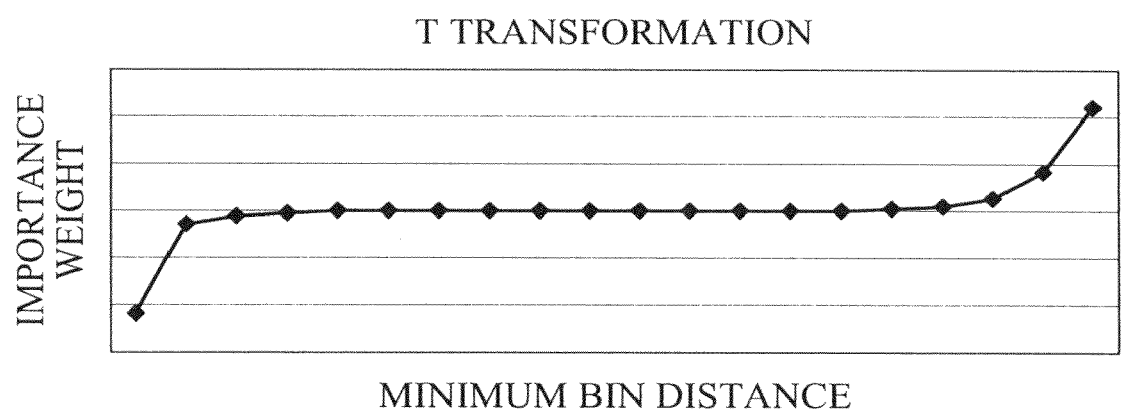
FIG. 7 illustrates an importance weight function according to an embodiment.

FIG. 6A is one color histogram of a color channel of one rectangle of a moving object. FIG. 6B is one color histogram of a color channel in areas of an image excluding the moving object. Each of the two histograms includes two bins, denoted as BIN-1 and BIN-2. As BIN-1 of the moving object is further in distance transformation (Equation 1 and Equation 2) from both bins of the background than BIN-2 of the moving object, the weight of BIN-1 of the moving object increases whereas the weight of BIN-2 of the moving object decreases as shown in FIG. 6C. FIG. 7 shows an importance weighting function T(x, y). The importance weighting function further increases the weight with a large bin distance, and decreases the weight with a small bin distance. The bin distance is calculated according to Equation 1 and Equation 2.

Hereinafter, disclosed is a method of indicating three color channels of a color image that independently forms the final color model using a one-dimensional (1D) color histogram. However, there are many variations and thus a 2D color histogram or a 3D color histogram is used. For example, there are three types of 2D color histograms in RGB color space that include a red-green, a red-blue, and a blue-green 2D color histograms. However, according to the present embodiment, it is possible to extract the discriminative color feature using the histograms in a similar way in different color spaces, such as YUV, HSV, etc.

Based on the final color model that is extracted and generated from the discriminative color feature, a color blob belonging to the moving object is extracted from a new input image. For each pixel in the input image, the similarity to the targeted moving object is formed into one weight matrix. The weight matrix has the same size as the input image. The element of the weight matrix is obtained from the accumulated weight of the final color histogram model. The final color histogram model may be obtained using a color pixel value.

In FIG. 8, there are two people. In this instance, one person is selected as a tracking object according to a predetermined scheme. For example, the person on the right side is selected as the tracking object. FIG. 8A is a new input image, FIG. 8B is a blob detection result of a human body model, and FIG. 8C is a blob detection result of a human head model. As the white color is widely distributed in the background and the other person, the white color of the tracking object has a low weight and occupies a large portion of the initial weight of the color histogram.

Referring to FIG. 9A, there are two head candidates from the human head detector with a shape model. Accordingly, the probability distribution of the human head is formed of a Gaussian distribution centered on the given head location. FIG. 9B is the color blob detection result using a head color model, and FIG. 9C is the color blob detection result using a body color model. In the color blob detection of the human head, the probability distribution of the human is formed of the Gaussian distribution centered on the given head location. When an upright human is assumed, the probability distribution extends downward to indicate the existence of the human body. In the color blob detection of the human body, the probability distribution of the human is formed of the Gaussian distribution centered on the given body location. As the human head is located in a top portion of the human body, which constrains the geometric relationship, the probability distribution extends upward to indicate the existence of the human head. Accordingly, referring to FIG. 9D, a centroid of the probability distribution may be calculated as the final location of the tracking object.

Although an embodiment has been shown and described, the present invention is not limited to the described embodiment. Instead, it would be appreciated by those skilled in the art that changes may be made to this embodiment without departing from the principles and spirit of the invention, the scope of which is defined by the claims and their equivalents.

What is claimed is:

1. A color feature extracting device, comprising:
    a main color extracting unit determining an object area of an input image corresponding to a size and a location of an object, dividing the object area and a non-object area of the input image into a plurality of rectangles, generating a color histogram for each color channel, and extracting a main color of an object rectangle from the color histogram;
    a weight calculating unit calculating a minimum distance between a color histogram bin of the object rectangle and a color histogram bin of a non-object rectangle with respect to the main color, a bin weight of the color histogram of the object rectangle, a color channel weight of the object rectangle, and a weight of the object rectangle to extract a discriminative color feature of the object; and
    a final color model generating unit generating a final color model of the object based on a result of re-weighting the color histogram bins of the object rectangle.

2. The color feature extracting device of claim 1, wherein the main color extracting unit comprises:
    an area divider determining the object area of the input image, dividing the object area and the non-object area of the input image into the plurality of rectangles;
    a histogram calculator generating the color histogram of the object rectangle and of the non-object rectangle and the color histogram of the non-object rectangle using the color channel, each color histogram being divided into a plurality of discrete bins; and
    a main color extractor extracting the main color of the object rectangle and of the non-object rectangle based on the generated color histogram of the object rectangle.

3. The color feature extracting unit of claim 1, wherein the weight calculating unit comprises:
    a minimum bin distance calculator calculating the minimum distance between the color histogram bin of the object rectangle and the color histogram bin of the non-object rectangle with respect to the main color;
    a bin weight calculator calculating the weight of the color histogram bin of the object rectangle based on the calculated minimum distance;
    a color channel weight calculator calculating the color channel weight of the object rectangle based on the calculated bin weight;
    a rectangle weight calculator calculating the weight of the object rectangle based on the calculated bin weight; and
    a bin re-weight calculator re-weighting the color histogram bin of the object rectangle based on the color channel weight and the weight of the object rectangle to extract the discriminative color feature of the object.

4. The color feature extracting device of claim 3, wherein the bin minimum distance calculator calculates the minimum distance between the color histogram bin of the object rectangle and the color histogram bin of the non-object rectangle according to, $$J[H_r^c(i), BG^c(j)] = \operatorname*{argmin}_j |b_i - b'_j|,$$

$$D_r^c(i) = |b_i - b'_j|$$

where c denotes the color channel, r denotes the object rectangle, $b_i$ denotes an $i^{th}$ bin, J denotes one bin of the color histogram of the non-object rectangle of the color channel with a minimum distance to the $i^{th}$ bin of the color channel from a main color histogram of the object rectangle, $H_r^c(i)$ denotes a color histogram of the $i^{th}$ bin of the color channel of the object rectangle, $BG^c(j)$ denotes a non-object color histogram of a $i^{th}$ bin of the color channel of the non-object rectangle, $b'_j$ denotes the $j^{th}$ bin, and $D_r^c(i)$ denotes a minimum distance between the $i^{th}$ bin of the color histogram bin of the object rectangle and a non-object rectangle color histogram with a same color channel.

5. The color feature extracting device of claim 3, wherein the bin weight calculator calculates the weight of the color histogram bin of the object rectangle according to, $$w_r^c(i) = T(D_r^c(i), s) \times |H_r^c(i) - BG^c(J)|,$$

where $s = \text{sign}(H_r^c(i) - BG^c(J)), T(x,y) = e^{x \times k \times y}$, and $k$ is a constant.

6. The color feature extracting device of claim 5, wherein the color channel weight calculator calculates the weight of the color channel of the object rectangle according to, $$w^c = \sum_{m=1}^{M} w_r^c(m)$$

$$W^c = \frac{w^c}{\sum_{k=1}^{K} w^k},$$

where M denotes a number of bins of an object rectangle histogram, K denotes a number of color channels, the weight of each bin of the color channel of the object rectangle is accumulated in $$w^c = \sum_{m=1}^{M} w_r^c(m),$$

and the weight of the color channel is calculated in $$W^c = \frac{w^c}{\sum_{k=1}^{K} w^k}.$$

7. The color feature extracting device of claim 6, wherein the rectangle weight calculator calculates the weight of the object rectangle according to, $$w_r = \sum_{k=1}^{K} \sum_{m=1}^{M} w_r^k(m),$$

$$W_r = \frac{w_r}{\sum_{l=1}^{L} w_l},$$

where L denotes a number of object rectangles, a sum of bin weight of the object rectangle histogram is calculated in $$w_r = \sum_{k=1}^{K} \sum_{m=1}^{M} w_r^k(m),$$

and the weight of the object rectangle is calculated in $$W_r = \frac{w_r}{\sum_{l=1}^{L} w_l}.$$

8. The color feature extracting device of claim 7, wherein the bin re-weight calculator re-weights the color histogram bin of the object rectangle, based on the color channel weight and the weight of the object rectangle, according to, $$W_r^c(i) = w_r^c(i) \times W_r \times W^c$$

and thereby calculates the re-weighted color histogram bin of the object rectangle $W_r^c(i)$.

9. The color feature extracting device of claim 8, wherein the final color model generating unit generates the final color model of the object according to, $$N = \{N^r, N^g, N^b\},$$

where, with respect to the color channel, $$N^c(i) = \sum_{r=1}^{R} \sum_{m=1}^{M} W_r^c(b_m = i),$$

R denotes a number of object rectangles, and M denotes the number of bins of the object rectangle histogram.

10. The color feature extracting device of claim 1, further comprising:
a color blob extracting unit extracting a color blob of the object from a new input image based on the final color model of the object.

11. The color feature extracting device of claim 10, further comprising:
an object locating unit performing blob analysis on the extracted color blob and calculating a centroid and a size of an object in the input image based on the blob analysis to locate and track the object.

12. A method of extracting a discriminative color feature, comprising:
determining an object area of an input image corresponding to a size and a location of an object;
dividing the object area and a non-object area of the input image into a plurality of rectangles, and generating a color histogram for each color channel to extract a main color of an object rectangle from the color histogram;
calculating a minimum distance between a color histogram bin of the object rectangle and a color histogram bin of the non-object rectangle to identify a discriminative color histogram bin of the object rectangle from the histogram bin of the non-object rectangle;
calculating a bin weight of the color histogram of the object rectangle based on the calculated minimum distance;
calculating a color channel weight of the object rectangle and a weight of the object rectangle based on the calculated bin weight of the color histogram of the object rectangle;
re-weighting the color histogram bin of the object rectangle based on the calculated color channel weight and the weight of the object rectangle to extract a discriminative color feature of the object; and generating a final color model of the object based on the result of re-weighting the color histogram bins of the object rectangle.

13. The method of claim 12, wherein the calculating of the minimum distance calculates the minimum distance between the color histogram bin of the object rectangle and the color histogram bin of the non-object rectangle according to, $$J[H_r^c(i), BG^c(j)] = \arg\min_j |b_i - b'_j|$$

$$D_r^c(i) = |b_i - b'_j|,$$

where c denotes the color channel, r denotes the object rectangle, $b_i$ denotes an $i^{th}$ bin, J denotes one bin of the color histogram of the non-object rectangle of the color channel with a minimum distance to the $i^{th}$ bin of the color channel from a main color histogram of the object rectangle, $H_r^c(i)$ denotes a color histogram of the $i^{th}$ bin of the color channel of the object rectangle, $BG^c(j)$ denotes a non-object color histogram of a $j^{th}$ bin of the color channel of the non-object rectangle, $b'_j$ denotes the $j^{th}$ bin, and $D_r^c(i)$ denotes a minimum distance between the $i^{th}$ bin of the color histogram bin of the object rectangle and a non-object rectangle color histogram with a same color channel.

14. The method of claim 12, wherein the calculating of the bin weight calculates the weight of the color histogram bin of the object rectangle according to, $$w_r^c(i) = T(D_r^c(i), s) \times |H_r^c(i) - BG^c(J)|,$$

where $s = \text{sign}(H_r^c(i) - BG^c(J))$, $T(x, y) = e^{x \times k \times y}$, and k is a constant.

15. The method of claim 14, wherein the color channel weight and the weight of the object rectangle is calculated according to, $$w^c = \sum_{m=1}^{M} w_r^c(m)$$

$$W^c = \frac{w^c}{\sum_{k=1}^{K} w^k},$$

where M denotes a number of bins of an object rectangle histogram, K denotes a number of colors channels, the weight of each bin of the color channel of the object rectangle is accumulated in $$w^c = \sum_{m=1}^{M} w_r^c(m),$$

and the weight of the color channel is calculated in $$W^c = \frac{w^c}{\sum_{k=1}^{K} w^k}.$$

16. The method of claim 15, wherein the calculating of the color channel weight and the weight of the object rectangle calculates the weight of the object rectangle according to, $$w_r = \sum_{k=1}^{K} \sum_{m=1}^{M} w_r^k(m),$$

$$W_r = \frac{w_r}{\sum_{l=1}^{L} w_l},$$

where L denotes a number of object rectangles, a sum of bin weight of the object rectangle histogram is calculated in $$w_r = \sum_{k=1}^{K} \sum_{m=1}^{M} w_r^k(m),$$

and the weight of the object rectangle is calculated in $$W_r = \frac{w_r}{\sum_{l=1}^{L} w_l}.$$

17. The method of claim 16, wherein the color histogram bin of the object rectangle is re-weighted based on the color channel weight and the weight of the object rectangle, according to, $$W_r^c(i) = w_r^c(i) \times W_r \times W^c,$$

and thereby calculates the re-weighted color histogram bin of the object rectangle $W_r^c(i)$.

18. The method of claim 17, wherein the final color model of the object is generated according to, $$N = \{N^r, N^g, N^b\},$$

where, with respect to the color channel, $$N^c(i) = \sum_{r=1}^{R} \sum_{m=1}^{M} W_r^c(b_m = i),$$

R denotes a number of object rectangles, and M denotes the number of bins of the object rectangle histogram.

19. The method of claim 12, further comprising:
extracting a color blob of the object from a new input image based on the final color model of the object.

20. The method of claim 19, further comprising:
performing blob analysis on the extracted color blob and calculating a centroid and a size of an object in the input image based on the blob analysis to locate and track the object.

* * * * *

UNITED STATES PATENT AND TRADEMARK OFFICE
CERTIFICATE OF CORRECTION

PATENT NO. : 8,331,667 B2
APPLICATION NO. : 12/216707
DATED : December 11, 2012
INVENTOR(S) : Maolin Chen et al.

It is certified that error appears in the above-identified patent and that said Letters Patent is hereby corrected as shown below:

In the Claims:

Column 12; Line 59 (Approx.); In Claim 4, delete "$\operatorname{argmin}_{j} |b_i - b'_j|,$" and insert -- $\arg\min_{j} |b_i - b'_j|$ --, therefor.

Column 13; Line 4; In Claim 4, delete "$i^{th}$" and insert -- $j^{th}$ --, therefor.

Signed and Sealed this
Fourteenth Day of May, 2013

Teresa Stanek Rea
*Acting Director of the United States Patent and Trademark Office*